United States Patent
Manenti et al.

(10) Patent No.: US 11,237,078 B2
(45) Date of Patent: Feb. 1, 2022

(54) MONITORING SYSTEM OF WIND-INDUCED MOTION OR VIBRATION IN AT LEAST ONE OVERHEAD CABLE, IN PARTICULAR A CONDUCTOR AERIAL CABLE OF A TRANSMISSION OR DISTRIBUTION

(71) Applicant: SICAME, Arnac-Pompadour (FR)

(72) Inventors: Alessandra Manenti, Rodano (IT); Francesco Ripamonti, Erba (IT)

(73) Assignee: SICAME, Arnac-Pompadour (FR)

( * ) Notice: Subject to any disclaimer, the term of this patent is extended or adjusted under 35 U.S.C. 154(b) by 0 days.

(21) Appl. No.: 17/413,289

(22) PCT Filed: Dec. 12, 2019

(86) PCT No.: PCT/IB2019/060687
§ 371 (c)(1),
(2) Date: Jun. 11, 2021

(87) PCT Pub. No.: WO2020/121230
PCT Pub. Date: Jun. 18, 2020

(65) Prior Publication Data
US 2021/0356351 A1  Nov. 18, 2021

(30) Foreign Application Priority Data

Dec. 13, 2018 (IT) .................. 102018000011059

(51) Int. Cl.
*G01L 5/04* (2006.01)
*G01M 5/00* (2006.01)
(Continued)

(52) U.S. Cl.
CPC ............ *G01M 5/0066* (2013.01); *G01L 5/04* (2013.01); *G01M 5/0025* (2013.01);
(Continued)

(58) Field of Classification Search
None
See application file for complete search history.

(56) References Cited

U.S. PATENT DOCUMENTS 5,517,864 A * 5/1996 Seppa .................. G01L 5/103
324/106
6,205,867 B1 * 3/2001 Hayes .................. G01C 9/00
73/862.391

(Continued)

FOREIGN PATENT DOCUMENTS

WO   WO2007031435 A1   3/2007

*Primary Examiner* — Tran M. Tran
(74) *Attorney, Agent, or Firm* — Dickinson Wright PLLC; Andrew D. Dorisio (57) ABSTRACT

The present invention relates to a monitoring system of wind-induced motion or vibration in at least one overhead cable (102), in particular a conductor aerial cable (102) of a transmission or distribution electric line. The monitoring system comprises: at least three sensor nodes (104) adapted to be installed in positions different from each other on a first overhead cable (102) and configured for detecting the motion or vibration through a synchronous signal acquisition. Each of the at least three sensor nodes (104) comprises a respective triaxial accelerometer sensor (301) configured for acquiring a first node signal and a first processor (302) configured for identifying, in the first node signal, a maximum node amplitude and an associated node frequency through a spectral analysis of the first node signal. The monitoring system further comprises a processing unit (105) operatively associable with the at least three sensor nodes (104) and comprising a second processor (401) configured for comparing to each other at least three maximum node amplitudes respectively of the at least three sensor nodes (104), for identifying a selected maximum amplitude and an associated selected frequency, the selected maximum amplitude being the maximum of the at least three maximum node (Continued)

amplitudes. The respective triaxial accelerometer sensor (301) in each of the at least three sensor nodes (104) is further configured for acquiring a second node signal. The first processor (302) is further configured for identifying, in the second node signal, a node selected amplitude and an associated node selected phase through a spectral analysis of the second node signal, the node selected amplitude and the node selected phase being associated with the selected frequency. The second processor (401) is further configured for calculating a numerical model based on at least three node selected amplitudes and associated at least three node selected phases, for all of the at least three sensor nodes (104), for reconstructing the motion or vibration in any point of the at least one overhead cable (102) according to the selected frequency. The present invention also relates to a related monitoring method and related sensor node.

14 Claims, 5 Drawing Sheets

(51) Int. Cl.
*H02G 1/02* (2006.01)
*H02G 7/00* (2006.01)

(52) U.S. Cl.
CPC ............ *G01M 5/0033* (2013.01); *H02G 1/02* (2013.01); *H02G 7/00* (2013.01)

(56) References Cited

U.S. PATENT DOCUMENTS

| | | | |
|---|---|---|---|
| 6,873,746 B2 * | 3/2005 | Stewart | G01R 31/58 382/291 |
| 7,494,271 B2 * | 2/2009 | Scholtz | H02J 3/00 374/185 |
| 7,620,517 B2 * | 11/2009 | Scholtz | H02G 7/02 702/130 |
| 7,786,894 B2 * | 8/2010 | Polk | H04L 12/66 340/870.07 |
| 7,930,141 B2 * | 4/2011 | Banting | G06F 11/0742 702/183 |
| 8,184,015 B2 * | 5/2012 | Lilien | H02G 1/02 340/870.04 |
| 8,280,652 B2 * | 10/2012 | Syracuse | G01R 15/142 702/57 |
| 8,386,198 B2 * | 2/2013 | Lancaster | H02J 3/00 702/60 |
| 9,158,036 B2 * | 10/2015 | Liu | G01W 1/02 |
| 9,366,688 B2 * | 6/2016 | Miller | G01P 5/10 |
| 9,488,670 B2 * | 11/2016 | Chan | G01H 17/00 |
| 9,647,454 B2 * | 5/2017 | Afzal | G01R 15/142 |
| 9,697,724 B2 * | 7/2017 | Miller | G08C 17/02 |
| 10,041,968 B2 * | 8/2018 | Nulty | H02J 13/00017 |
| 10,197,610 B2 * | 2/2019 | Lilien | G01R 19/0092 |
| 10,205,307 B2 * | 2/2019 | Lancaster | H02J 13/00017 |
| 10,209,291 B2 * | 2/2019 | Sozer | G01R 31/085 |
| 10,317,570 B2 * | 6/2019 | Lilien | H02G 1/02 |
| 10,390,111 B2 * | 8/2019 | Yogeeswaran | G01R 31/11 |
| 10,613,123 B2 * | 4/2020 | Gudmundsson | G01R 29/0814 |
| 10,948,531 B2 * | 3/2021 | Pinney | G01P 5/02 |
| 11,150,648 B2 * | 10/2021 | Bharatiya | B60Q 1/50 |
| 2005/0286190 A1 * | 12/2005 | Rostron | G01R 15/142 361/65 |
| 2012/0029871 A1 * | 2/2012 | Spillane | H02G 7/00 702/158 |
| 2012/0197589 A1 * | 8/2012 | Kansala | H02G 7/04 702/141 |
| 2012/0278011 A1 | 11/2012 | Lancaster | |

* cited by examiner

MONITORING SYSTEM OF WIND-INDUCED MOTION OR VIBRATION IN AT LEAST ONE OVERHEAD CABLE, IN PARTICULAR A CONDUCTOR AERIAL CABLE OF A TRANSMISSION OR DISTRIBUTION

TECHNICAL FIELD

The present invention relates to a monitoring system of wind-induced motion or vibration in at least one overhead cable.

In general, the present invention finds its application in the field of single or in bundles cables of transmission and distribution electric lines, which are often subjected to oscillatory and vibration phenomena of different entities, caused by the action of the wind on the overhead cable along the spans between successive pylons.

PRIOR ART

As it is well known in the specific technical field, a recurring problem for the overhead cables subjected to external environment stresses, particularly of the wind, is represented by the oscillations and vibrations that may damage for fatigue the structure of the cable itself or of the electric line in which the cable is inserted.

The oscillations and vibrations which in particular the overhead cables are subjected to generally differ from each other based on the frequency of oscillation, which varies according to the speed of the wind which hits these cables.

In particular, with weak or moderate wind speeds, typically below 8 m/s, medium-high frequency vibrations, between 5 and 100 Hz, and with small amplitude, typically lower than the cable diameter, of the so-called "aeolian" type are established. Aeolian-type vibrations can take place on almost all transmission lines and at any time and is therefore the most common and prevailing type of oscillation. The aeolian vibrations, although of minimum amplitude, carry continuous alternating bending oscillations on the conductor cable, particularly in the rest and support points, with progressive fatigue up to damage due to cable breakage, as well as other elements of the line that are involved, such as insulators, protection systems, etc. The functionality of the system is thus impaired, even seriously. In general, the prevention and control of aeolian vibrations are carried out by means of reinforcing devices and, especially, with anti-vibration dampers, to be suitably sized and arranged along the specific line. Of course, special precautions are taken as early in the design phase, for instance: avoiding excessive mechanical tension and spans of considerable length, adopting terminal blocks and accessory components of accurate design, etc.; the whole compatible with the layout of the line and its power characteristics.

However, in the presence of medium and strong winds on the cable bundles, typically between 8 m/s up to about 20 m/s, the so-called "sub-span" oscillations are established, between spacer and spacer, of medium frequency, around 1 Hz. This sub-span phenomenon leads, in the cable bundles, to stresses at the clamps of the spacers and to the possible collision and mutual damage of the cables.

Furthermore, in the presence of strong winds, typically above 15 m/s, and in particular in the case of ice formation on the cables, both single and bundled, it is possible that the so-called "galloping" is established, i.e. oscillations with great amplitude and low frequency, between 0.2 and 0.5 Hz.

To overcome the problems caused by oscillations and vibrations of the eolian, sub-span and galloping type, different systems have been developed, which allow detecting the vibrations and oscillations of the cables, in order to define the operating conditions of the line and to avoid irreversible damage to the line itself.

European patent application EP 1 574 822 A1 describes a remote monitoring system of the state of electric aerial lines, comprising a housing body in which a supplying module is provided, measuring and transmitting trim parameters connected to the conductor cable to be monitored, by suitable connection means.

Chinese patent application CN 102279084 A describes an oscillation identification system of an electric transmission line, based on the combination of micro-inertial measurements. This system provides a monitoring machine on the pylon connected to a central system, wherein the monitoring machine on the pylon is wirelessly connected with at least two wireless inertial nodes. Each wireless inertial sensor node comprises an accelerometer and a gyroscope. The nodes of the inertial sensor acquire acceleration values and space angles of a monitoring point of the cable in the three spatial directions and send all of the detected data to the monitoring machine and to the central system to perform a data analysis and an oscillation evaluation.

The known systems, however, have a series of drawbacks.

In particular, the known systems require considerable computing power, in the absence of which it is possible to incur an unsatisfactory forecast of the numerical model relating to the cable oscillation.

Moreover, the known systems require a high data exchange between wireless inertial sensor nodes and monitoring machine, among other things involving a transmission energy expenditure.

Moreover, the known systems are inaccurate in predicting the deformations of the aerial cables in the presence of the different vibration and oscillation phenomena, in particular of the aeolian-type vibrations, unless it is possible to rely on the use of high computing powers, however considered excessive for field applications.

SUMMARY OF THE INVENTION

An object of the present invention is to overcome the prior art drawbacks.

In particular, an object underlying the present invention is to accurately monitor vibratory and oscillatory phenomena which aerial cables are subjected to, thus obtaining parameters necessary for their evaluation starting from a finite set of representative data detected by suitable sensors.

A further object is to optimize the information exchange between a centralized processing system and local detection systems.

A further object of the present invention is to conceive an effective and robust system which does not require excessively frequent maintenance.

These and other objects are achieved by a wind-induced motion or vibration monitoring system and a related method, and a related sensor node according to the features of the appended claims which form an integral part of the present description.

According to an aspect, the present invention provides a monitoring system of wind-induced motion or vibration in at least one overhead cable, in particular a conductor aerial cable of a transmission or distribution electric line, said monitoring system comprising at least three sensor nodes adapted to be installed in positions different from each other on a first overhead cable and configured for detecting the motion or vibration by a synchronous signal acquisition.

Each of the at least three sensor nodes comprises a respective triaxial accelerometer sensor configured for acquiring a first node signal and a first processor configured for identifying in said first node signal a maximum node amplitude and an associated node frequency by a spectral analysis of the first node signal.

The monitoring system further comprises a processing unit operatively associable with the at least three sensor nodes and comprising a second processor configured for comparing to each other at least three maximum node amplitudes respective of the at least three sensor nodes, for identifying a selected maximum amplitude and an associated selected frequency, said selected maximum amplitude being the maximum of the at least three maximum node amplitudes.

The respective triaxial accelerometer sensor in each of the at least three sensor nodes is further configured for acquiring a second node signal. The first processor is further configured for identifying in said second node signal, a node selected amplitude and an associated node selected phase through a spectral analysis of the second node signal, said node selected amplitude and node selected phase being associated with the selected frequency, that is the frequency associated with the maximum amplitude of the at least three maximum node amplitudes, previously selected.

The second processor is further configured for calculating a numerical model based on at least three node selected amplitudes and associated at least three node selected phases, for all of the at least three sensor nodes, for reconstructing the motion or vibration in any point of the at least one overhead cable according to the selected frequency.

Advantageously, the present invention allows optimizing the information exchange between sensor nodes applied on the cable and outer processing unit, maximizing the amount of data sent to the sole number of data necessary for the reconstruction of the global model of the aerial cable.

Advantageously, the present invention allows achieving a high forecast capacity of the oscillation and vibration model of the aerial cable, effectively using a subset of the measurable parameters, thus optimizing the necessary computing power.

Preferably the second processor is further configured for calculating, through the numerical model, a maximum amplitude calculated at an antinode of a dynamic deformation of at least one overhead cable, and the processing unit is further configured for transmitting to at least one remote server, preferably through a cellular or satellite connection, at least one piece of information depending on said calculated maximum amplitude, preferably further depending on the selected frequency.

Still preferably, the remote server comprises at least one third processor configured for reconstructing a damage parameter for fatigue of the at least one overhead cable based on this piece of information depending on the calculated maximum amplitude, and further comprises a memory configured for storing a time history of the damage parameter, for a useful life forecast of the at least one overhead cable, preferably through the "Big Data" approach.

Advantageously the system is capable of performing both an instantaneous analysis and a forecast analysis of the structural conditions of the aerial cable and of the line whereon it is mounted, so as to evaluate a damage degree for fatigue and to determine maintenance operations to be carried out, further ensuring a functional and time optimization of the useful life of the structures involved.

According to a further aspect, the present invention provides a monitoring method of wind-induced motion or vibration in at least one overhead cable, in particular a conductive aerial cable of a transmission or distribution electric line, said monitoring method comprising:
  installing at least three sensor nodes in positions different from each other on a first overhead cable and detecting the motion or vibration through a synchronous signal acquisition;
  in each of the at least three sensor nodes, acquiring a first node signal through a respective triaxial accelerometer sensor;
  in each of the at least three sensor nodes, identifying, in the first node signal, a maximum node amplitude and an associated node frequency through a spectral analysis of the first node signal;
  operatively associating a processing unit with the at least three sensor nodes;
  in the processing unit, comparing to each other at least three maximum node amplitudes respective of the at least three sensor nodes, for identifying a selected maximum amplitude and an associated selected frequency, the selected maximum amplitude being the maximum one of the at least three maximum node amplitudes;
  in each of the at least three sensor nodes, acquiring a second node signal through the respective triaxial accelerometer sensor;
  in each of the at least three sensor nodes, identifying, in the second node signal, a node selected amplitude and an associated node selected phase through a spectral analysis of the second node signal, the node selected amplitude and the node selected phase being associated with the selected frequency;
  in the processing unit, calculating a numerical model based on at least three node selected amplitudes and associated at least three node selected phases, for all of the at least three sensor nodes, for reconstructing the motion or vibration in any point of the at least one overhead cable according to the selected frequency.

According to a further aspect, the present invention provides a sensor node for monitoring the wind-induced motion or vibration in at least one overhead cable.

Further features and advantages will become more apparent from the following detailed description of preferred non-limiting embodiments of the present invention, and from the dependent claims which outline preferred and particularly advantageous embodiments of the invention.

BRIEF DESCRIPTION OF THE DRAWINGS

The invention is illustrated with reference to the following figures, provided by way of non-limiting example, in which.

In the different figures, similar elements will be identified by similar reference numbers.

DETAILED DESCRIPTION

Figure 1:
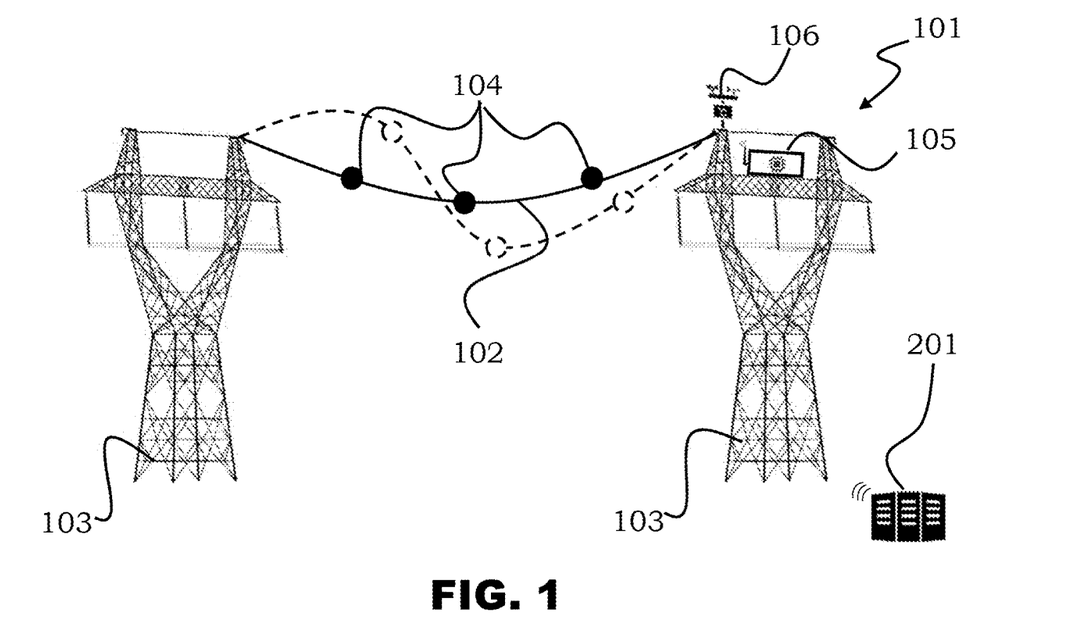
FIG. 1 illustrates a schematic view of a monitoring system according to an embodiment of the present invention, applied to a span of an overhead cable.

FIG. 1 illustrates a schematic view of a monitoring system 101 of wind-induced motion or vibration according to the present invention, applied to a span of an overhead cable 102 between a pair of pylons 103, in particular of a conductor aerial cable 102 of a transmission or distribution electric line.

On the overhead cable 102 at least three sensor nodes 104 are provided, which are installed in different positions on the length of the overhead cable 102. "Sensor node" 104 means a detection device adapted to acquire and process a signal depending on an outer variation of a mechanical quantity. According to the present invention the sensor nodes 104 are configured for detecting the motion or vibration of the overhead cable 102 through an acquisition of signals that are synchronous with each other.

Furthermore, the monitoring system 101 comprises a processing unit 105, operatively associable with the three sensor nodes 104. The processing unit 105 is in communication with each of the sensor nodes 104, so as to perform, through a reference parameter exchange, a calculation of a maximum amplitude calculated at a corresponding selected frequency. "Calculated maximum amplitude" means a numerical reference in absolute value, of the maximum oscillation amplitude present along the span of the overhead cable 102. "Selected frequency" means an oscillation frequency which the calculated maximum amplitude is associated with, said frequency being selected according to the modes that will be described hereinafter.

Moreover, the monitoring system 101 comprises an anemometer device 106 operatively associable with the processing unit 105 and installable in proximity of the overhead cable 102, for instance on the pylon 103. The anemometer device 106 measures at least one wind direction and speed. Based on the identified wind direction and speed, the processing unit 105 identifies a corresponding processing mode, discriminating the vibratory phenomenon in progress.

In a preferred embodiment, the anemometer device is integrated into a more complex weather station, capable of detecting, in addition to the aforementioned wind direction and speed, also temperature, pressure and humidity conditions, etc., in order to determine an overview of the environmental conditions in which the overhead cable 102 operates, and to carry out further signal processing based on this information.

Figure 2:
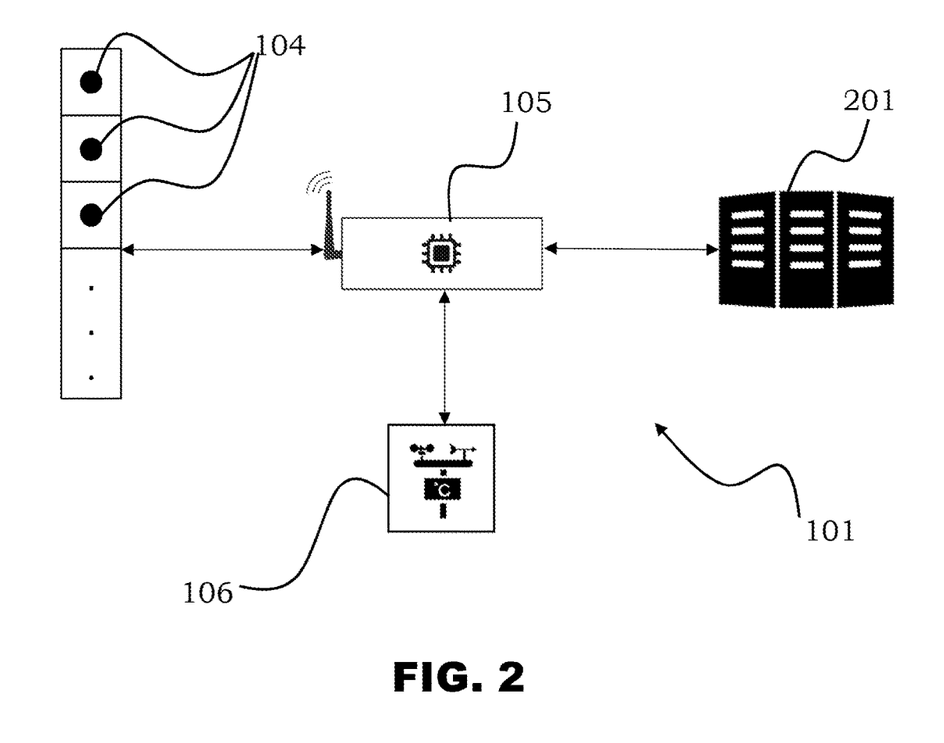
FIG. 2 illustrates a functional diagram of the monitoring system of FIG. 1.

As visible in FIG. 1 and as mostly pointed out in the functional diagram of FIG. 2, the processing unit 105 is further configured for transmitting to at least one remote server 201.

Figure 3:
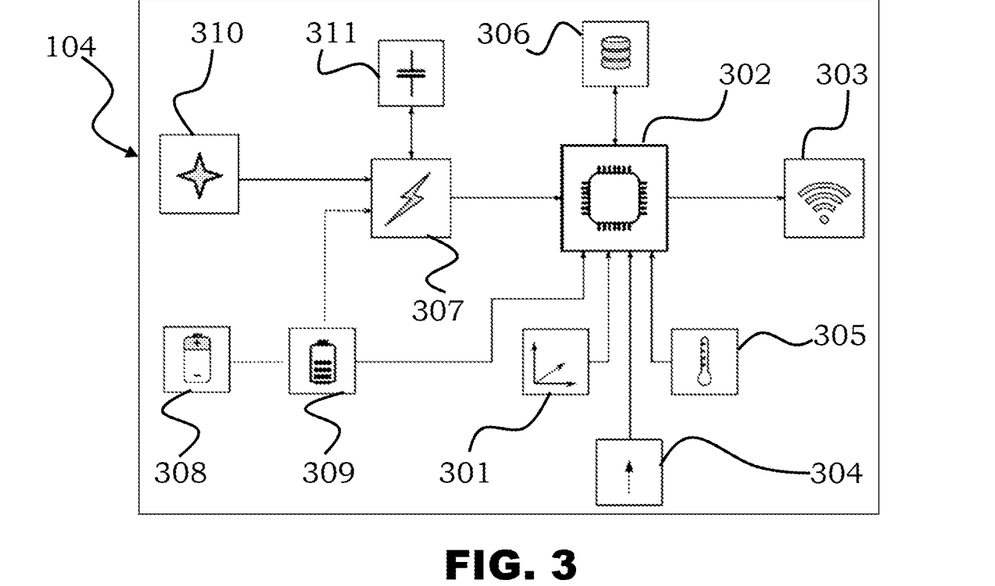
FIG. 3 illustrates a functional diagram of the sensor node of FIG. 2.

Each of the sensor nodes 104, as visible in the functional diagram of FIG. 3, comprises a respective triaxial accelerometer sensor 301 configured for acquiring a first node signal. Moreover, each of the nodes 104 comprises a first processor 302 configured for identifying in the first node signal a maximum node amplitude and an associated node frequency, through a spectral analysis of the first node signal. Each node 104 is provided with a first transceiver unit 303, preferably operating according to a Wi-Fi protocol, so as to transmit a first piece of information representing each maximum node amplitude and of the associated node frequency to the processing unit 105.

Preferably, each node 104 comprises an internal bus 304.

Still preferably each node 104 provides a temperature sensor 305 for detecting any limit temperatures (excessively high or low) which the sensor node 104 is subjected to.

An internal memory 306 is further provided, which allows data storage, even only for a limited period of time, for instance in case of undesired disconnection of the sensor node 104 from the processing unit 105, and thus avoiding possible loss of relevant data.

To the first processor 302 an integrated energy management circuit 307 is connected, which is connected alternatively or in combination with a battery 308, including its own charge status indicator 309, an energy recovery device 310 and/or a condenser 311.

It is to be understood that nothing prevents the adoption of sensor node 104 power supply means different from the described example.

Figure 4:
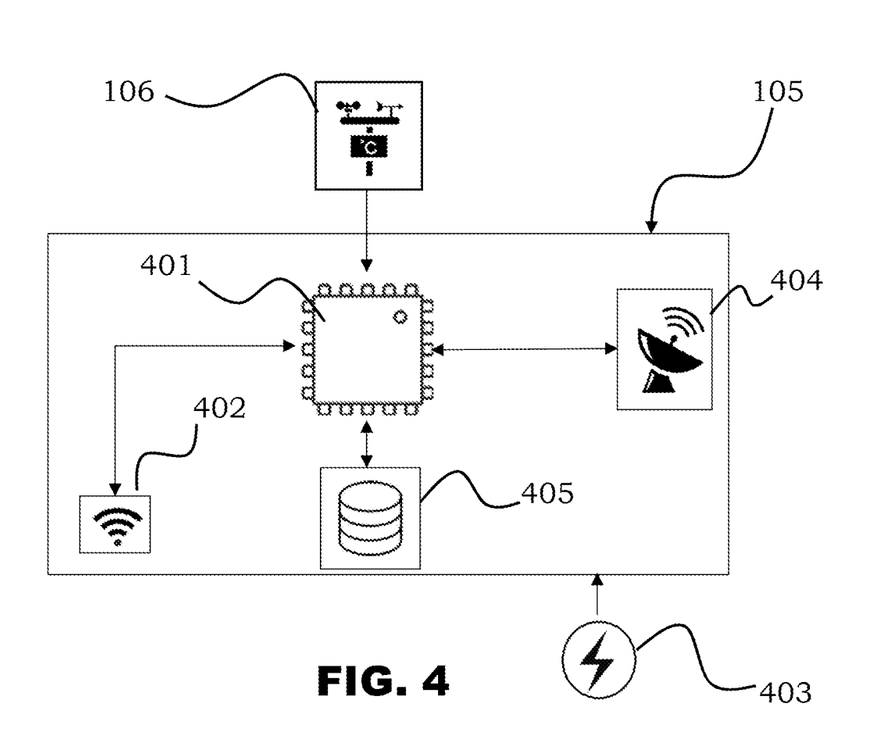
FIG. 4 illustrates a functional diagram of the processing unit of FIG. 2.

Correspondingly the processing unit 105, as visible in the functional diagram of FIG. 4, comprises a second processor 401.

The processing unit is powered by a power supply 403.

Furthermore, the processing unit 105 comprises an internal memory 405, capable of storing a certain amount of data prior to communicating with the remote server 201, so as to limit the number of information exchanges with the remote server 201, thus optimizing the data and transmission band management.

The second processor 401 is configured for receiving the first piece of information through a second transceiver unit 402, preferably operating through the Wi-Fi protocol. Once said first piece of information has been received, the second processor 401 is configured for comparing with each other the three maximum node amplitudes respective of the three sensor nodes, for identifying a selected maximum amplitude and the associated selected frequency.

"Selected maximum amplitude" means the maximum amplitude between the three maximum node amplitudes.

The processing unit 105 is further configured for transmitting a second piece of information representing the selected frequency to the sensor nodes 104, through the second transceiver unit 402.

The sensor nodes 104 are adapted to acquire, through the first transceiver unit 303, the second piece of information and to acquire each, at the selected frequency, a second node signal through the respective triaxial accelerometric sensors 301. Through a spectral analysis of the second signal of the respective first processors 302, a node selected amplitude and an associated node selected phase is identified for each sensor node 104.

The second processor 401, through the transmission between the transceiver units 303 and 402, is configured for receiving from each sensor node a third piece of information representing the node selected amplitude and associated node selected phase.

Based on all of the three node selected amplitudes and associated at least three node selected phases, the second processor 401 is thus configured for calculating a numerical model and reconstructing the motion or vibration in any point of the overhead cable 102 according to the selected frequency.

In particular, a frequency analysis is carried out through the so-called Fast Fourier Transform (FFT), and from the resulting spectrum the three harmonics associated with the selected frequency are extracted. The three harmonics thus extracted are used for obtaining the parameters of a model describing the deformation of the overhead cable 102 at the selected frequency and in the presence of damping.

The operation is carried out through a "best fitting" approach, parametric on a reference position ($x_0$) and a progressive and regressive wavelength of the waves ($\lambda$).

Within such a reconstructed dynamic deformation, the second processor 401 is also configured for calculating the calculated maximum amplitude ($Y_{MAX}$), at an antinode of the dynamic deformation.

As stated, the processing unit 105 is configured for transmitting to a remote server 201, preferably through a cellular or satellite connection 404. Through said connection 404 a piece of information depending on the calculated maximum amplitude is transmitted, preferably further depending on the selected frequency, still more preferably the parameter $f*Y_{MAX}$, namely the product of the calculated maximum amplitude ($Y_{MAX}$) by the relative frequency (f), which is correlated to the instant damage level of the overhead cable.

The remote server 201 comprises a third processor which, from this piece of information, is capable of reconstructing a damage parameter for fatigue of the overhead cable 102. This damage parameter for fatigue is stored in evolution over time, inside a memory, so as to maintain a time history. The knowledge of said time history may be advantageously used for a useful life forecast analysis of the overhead cable 102, preferably through a so-called "Big Data" approach, so as to get to an early evaluation of the necessary maintenance operations, based on objective criteria.

In case of wind speeds detected by the anemometer device 106 exceeding a first threshold corresponding to "sub-span vibrations", the first processor 302 of the sensor node 104 is further configured for identifying, in the first node signal, a maximum node phase.

Correspondingly, the second processor 401 is further configured for receiving from at least one sensor node 104 said associated node maximum phase, along with the maximum node amplitude and associated node frequency already transmitted and calculating a second numerical model based on information on the motion or vibration on directions that are orthogonal with respect to an axis of the overhead cable 102.

In case of wind speeds detected by the anemometer device 106 exceeding a second threshold corresponding to "galloping vibrations", greater than the first threshold, the second numerical model further considers an overhead cable 102 tension.

Figure 5:
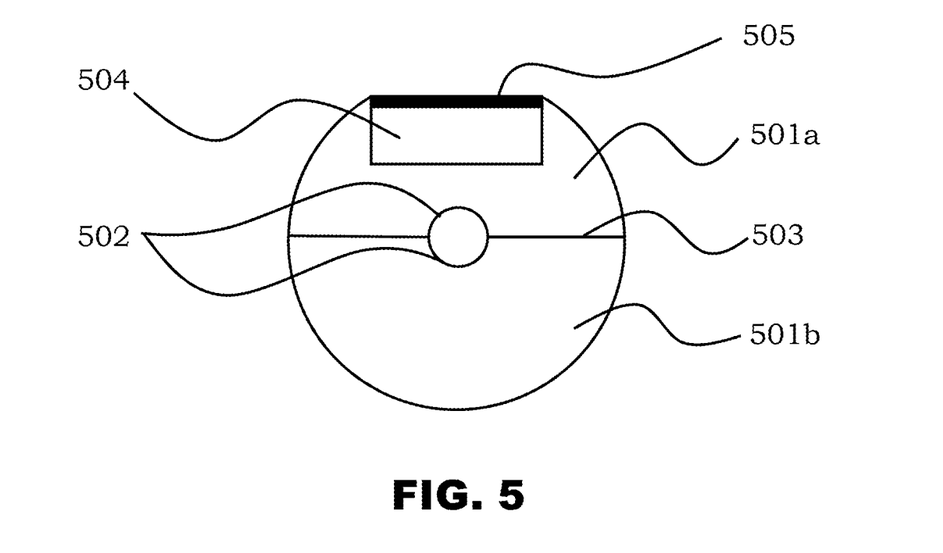
FIG. 5 illustrates a schematic view of an embodiment of a sensor node according to the present invention.

For a secure mechanical connection to the overhead cable 102, the sensor node 104, as visible in FIG. 5, is preferably conformed as a jaw device.

In particular, in this exemplifying embodiment, the sensor node 104 is made of two hemispherical elements 501a and 501b including a recess 502 on each plane surface 503, conformed so as to receive the overhead cable 102 once the two hemispherical elements 501a and 501b are mechanically connected.

The mechanical connection between the two hemispherical elements 501a and 501b may provide different alternatives, from quick attachment and detachment systems, such as a spring system, to more fixed mounting solutions, such as a threaded connection. Inside at least one of the hemispherical elements 501a or 501b a housing space 504 is provided, wherein the components for detecting the motion or vibration through synchronous acquisition of the signals is housed, according to what has been already described.

In the housing 504 are thus preferably provided the triaxial accelerometer sensor 301, configured for acquiring the first and second node signals, and the first processor 302, configured for identifying, through a spectral analysis, in the first node signal, the maximum node amplitude and the associated node frequency, and in the second node signal the node selected amplitude and the associated node selected phase. The sensor node 104 is operatively associable with the processing unit 105, which identifies the selected frequency which the node selected amplitude and the node selected phase are associated with.

Furthermore, the sensor node 104 comprises a solar panel 505 for own supply, under favorable environmental conditions.

Figure 6:
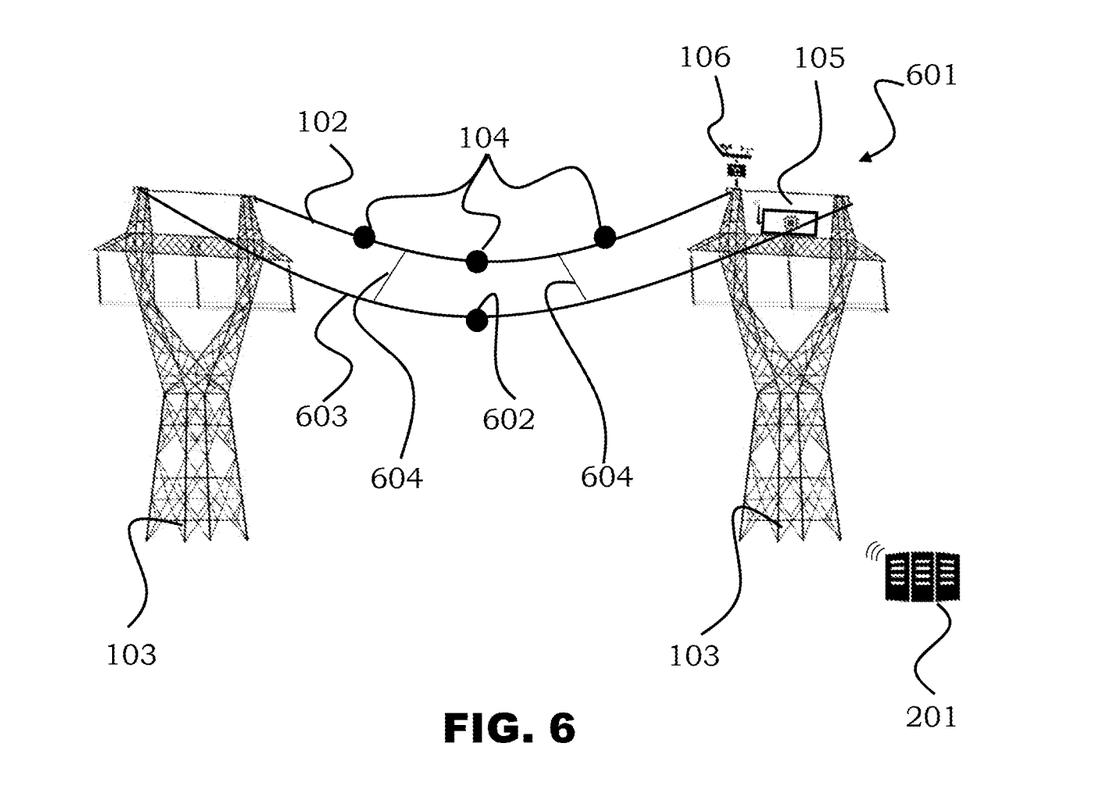
FIG. 6 illustrates a schematic view of a monitoring system according to a further embodiment of the present invention, applied to a span of a 2-bundle overhead cable.

According to a second embodiment, shown in FIG. 6, a monitoring system 601 of wind-induced motion or vibration according to the present invention is applied to a span of an overhead 2-bundle beam 602.

The monitoring system 601 comprises at least one fourth sensor node 602 adapted to be installed on at least one second overhead cable 603, in a position aligned to one of the three sensor nodes 104. The fourth sensor node 602 is thus configured to detect a motion o vibration, analogously to the first embodiment, through a synchronous signal acquisition.

Preferably, according to the second embodiment, spacers 604 are provided between the overhead cables 102 and 603, in order to reduce the risk of collisions or entanglements.

In general, the present invention provides the use of a number of sensor nodes of at least three or more, on a first overhead cable, and of at least one or more on each additional overhead cable parallel to the first overhead cable (under conditions of 2-bundle cable, 3-bundle cable, etc.). The total number of sensor nodes used mainly depends on cost criteria, keeping in mind that the present invention reaches effective results even for a reduced number of sensor nodes.

Figure 7:
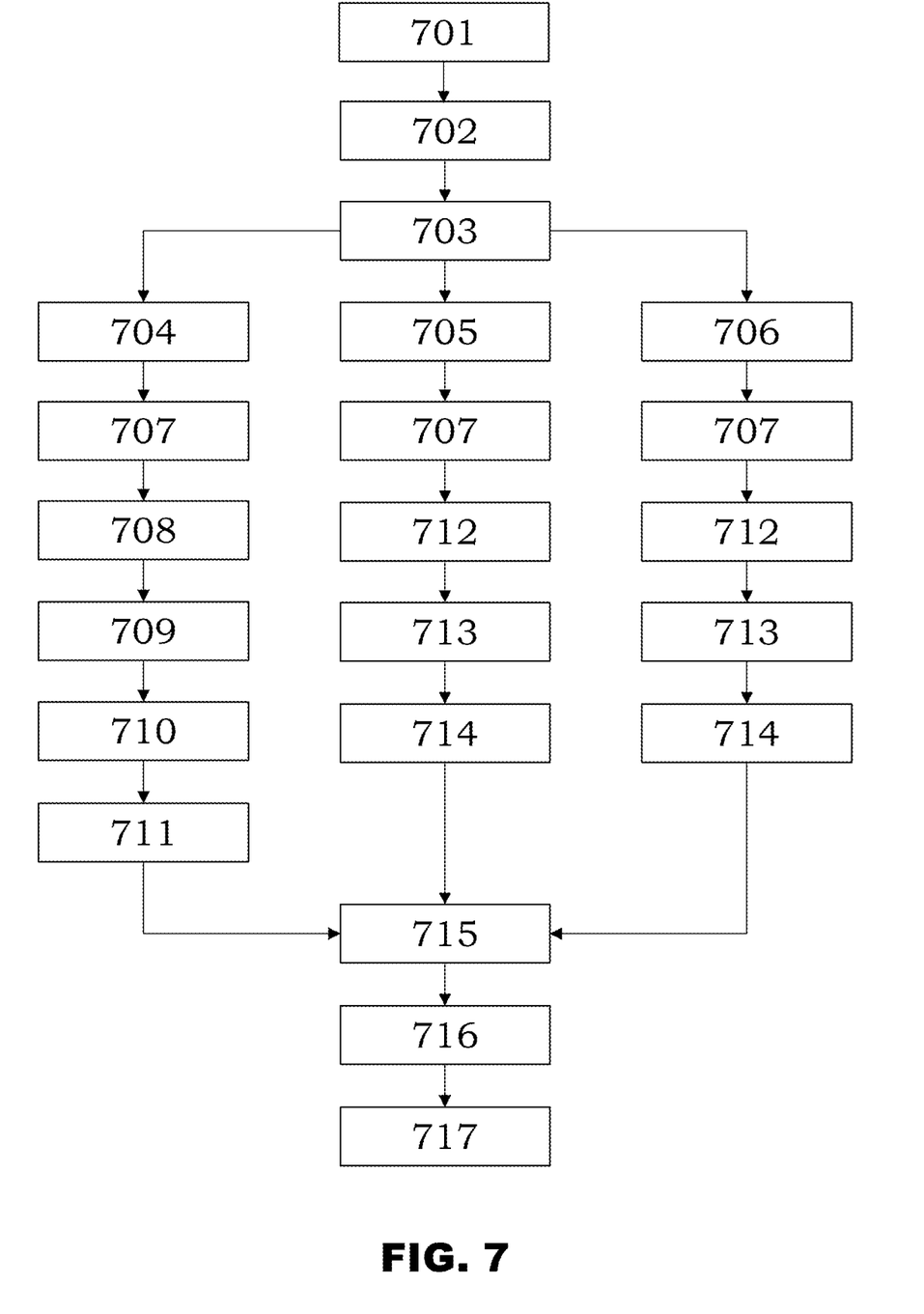
FIG. 7 illustrates a flow chart relating to a monitoring method according to the present invention.

A monitoring method according to the present invention will now be described, particularly referring to the flow chart represented in FIG. 7.

First of all, the monitoring method of wind-induced motion or vibration in at least one overhead cable provides an installation step 701 which provides installing at least three sensor nodes in positions different from each other on the first overhead cable 102 and operatively associating a processing unit 105 with the at least three sensor nodes 104. In the installation step 701, an anemometer device 106 is further installed, preferably in proximity of the at least one overhead cable 102 and said anemometer device 106 is associated with the processing unit 105. In the event of an at least 2-bundle structure of the overhead cable 102, in this installation step 701 the at least one fourth sensor node 602 is provided to be installed on the at least one second overhead cable 603 in a position aligned with one of the at least three sensor nodes 104.

This installation step 701 is followed by an identification step 702 in which, through the anemometer device 106, the wind conditions present are detected, in particular at least one wind direction and speed are measured. This identification step 702 is strictly linked to a selection step 703, in which, in the processing unit 105, a processing mode based on the wind direction and speed is identified, and a subroutine specific for the detected wind condition is set. In particular, it is possible to detect whether the wind speed and direction conditions lead to the onset of oscillations of the "eolian" 704, "sub-span" 705, or "galloping" 706 type.

Furthermore, if there is a more complex weather station, it is also possible to detect a presence of ice on the overhead cable 102.

Regardless of the type of oscillation, an acquisition step 707 follows, in which each of the at least three sensor nodes 104 acquires, synchronously with the other sensor nodes 104, a first node signal through a respective triaxial accelerometer sensor 301.

In case of oscillation of the "eolian" type, the monitoring method provides an identification step of the first local maximum 708, in which each of the three sensor nodes 104 identifies in the first node signal a maximum node amplitude and an associated node frequency through a spectral analysis of the first node signal.

From each sensor node a first piece of information representing these data is transmitted to the processing unit 105, in which a comparison step 709 is provided, a step in which the at least three maximum node amplitudes respective of the at least three sensor nodes are compared to each other, for identifying a selected maximum amplitude and an associated selected frequency. As stated, the selected maximum amplitude corresponds to the maximum one of the at least three maximum node amplitudes.

A second piece of information representing this identified selected frequency is sent again to each of the sensor nodes 104, which operates a second local maximum identification step 710. In this second local maximum identification step 710, each sensor node acquires a second node signal, still through the respective triaxial accelerometer sensor 301. Inside the second node signal, a node selected amplitude and an associated node selected phase are identified through a spectral analysis. The node selected amplitude and the node selected phase are thus associated with the selected frequency.

A third piece of information representing the amplitudes and selected node phases is sent again to the processing unit 105, which operates a modelling step 711, in which it calculates a numerical model based on the at least three node selected amplitudes and associated at least three node selected phases, for all of the sensor nodes 104, for reconstructing the motion or vibration in any point of the at least one overhead cable 102 according to the selected frequency.

In the event that the wind speeds detected by the anemometer device 106 are greater than the one typically linked to the onset of the sole oscillations of the "eolian" type, the monitoring method provides a differentiation after the acquisition step 707.

In particular, for wind speeds exceeding a first threshold, corresponding to "sub-span" or "galloping" conditions, in at least one of the at least three sensor nodes 104, a phase identification step 712 is provided, in which a maximum node phase is identified in the first node signal.

Once the maximum node phase has been further identified, associated with the maximum node amplitude and the maximum node frequency, the processing unit 105 operates a second modelling step 713, in which it calculates a second numerical model.

The second modelling step 713, in case of "sub-span" conditions, with wind speeds exceeding a first threshold, further takes into consideration information on motion or vibration on directions that are orthogonal with respect to an axis of the at least one overhead cable. In this way it is possible to foresee possible overlaps of the trajectories covered by the overhead cables with consequent potentially harmful collisions.

In the event of wind conditions that lead to "galloping" oscillations, with wind speeds exceeding a second threshold greater than said first threshold, the second modeling step 713 takes into further consideration a tension of the least one overhead cable 102, a most incident parameter in the evaluation of possible structural damage to the electric line at the cable connections.

The second modeling step 713 is followed by a combination step 714, which considers possible overlapping effects between those provided by the considered oscillation and vibration modes.

Once the numerical models have been evaluated, for any detected oscillation and vibration mode, in a preferred embodiment of the invention, the monitoring method further comprises a maximum amplitude extrapolation step 715. The latter step provides calculating, through the numerical model, a calculated maximum amplitude ($Y_{MAX}$), at an antinode of a dynamic deformation of the at least one overhead cable 102. A piece of information depending on the calculated maximum amplitude ($Y_{MAX}$) is further transmitted, in a remote sending step 716, to at least one remote server 201. Preferably this piece of information further depends on the selected frequency. Still preferably the piece of information sent to the remote server 201 is precisely the already described parameter $f*Y_{MAX}$.

Preferably, a damage evaluation step 717 is also further provided, which provides, in the remote server 201, reconstructing a damage parameter for fatigue of the least one overhead cable 102 based on the above piece of information depending on the calculated maximum amplitude ($Y_{MAX}$), and storing a time history of this damage parameter, for a useful life forecast of the at least one overhead cable 102, preferably through the "Big Data" approach.

In general, the monitoring method according to the present invention is implementable in the monitoring system 101 according to the present invention. The features of the latter are thus to also be referred to the method, according to what has been herein described.

Figure 8:
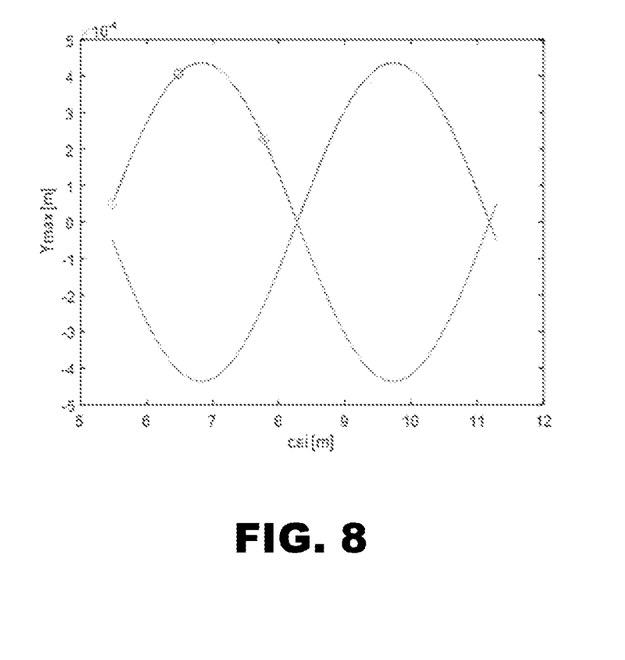
FIG. 8 illustrates a first exemplifying output of the monitoring system according to the present invention.
Figure 9:
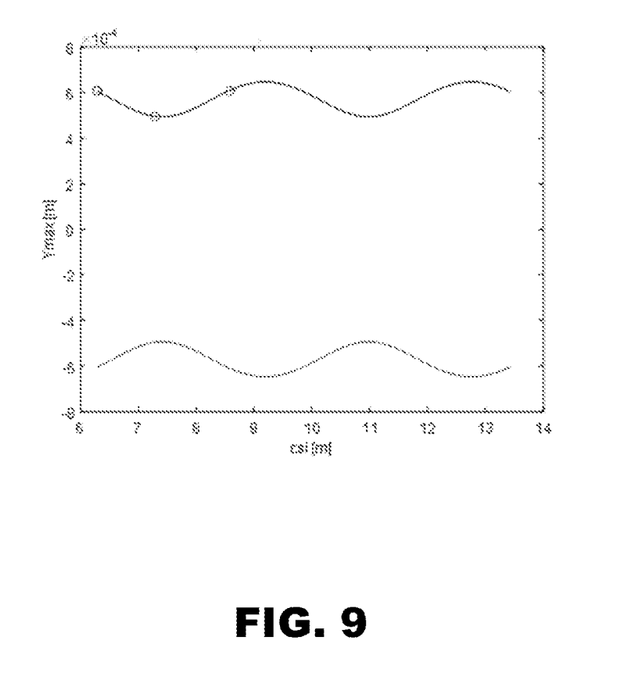
FIG. 9 illustrates a second exemplifying output of the monitoring system according to the present invention.

In FIGS. 8 and 9 two exemplifying outputs of the monitoring system and of the monitoring method according to the present invention are illustrated, in the presence of oscillations of the "eolian" type and of damping on the overhead cable.

The deformation of the overhead cable 102 is viewed, on which it is further possible to punctually and numerically identify the calculated maximum amplitude ($Y_{MAX}$).

In particular, the case of "low damping" is considered in FIG. 8, whereas a case of "high damping" is considered in FIG. 9.

INDUSTRIAL APPLICABILITY

Advantageously, the present invention allows measuring the maximum amplitude $Y_{MAX}$ along the span of an overhead cable 102 and the connected frequency, parameters which are more easily correlated to the possible useful life for fatigue of the overhead cable 102 itself with respect to the lateral bending measurements (or "bending test") generally adopted. Indeed, the tools used in the "bending tests" require great attention during the installation step, with consequent greater possibility of small error even in the result obtained.

The present invention is optimal in monitoring the oscillation and vibration phenomena of the "eolian" type. Furthermore, the present invention is particularly effective in monitoring all the oscillation and vibration phenomena of the above "eolian", "sub-span", "galloping" type, induced by the interaction between wind and overhead cable 102. Most of the current systems only allow considering one specific phenomenon.

A further advantage of the present invention is given by the reduction of the data transmitted by the sensor node 104 to the processing unit 105, with obvious saving in terms of band usage and energy consumption.

Still a further advantage of the present invention is given by the fact that the reconstructed motion model of the overhead cable 102 is capable of describing the behaviour of the electric line as a whole, unlike the punctual-type measurements.

Still advantageously, the possibility of allocating already processed data on a remote server 201 also allows monitoring multiple sensor nodes 104 and multiple electric lines in parallel.

Finally, advantageously the monitoring system provides a reduced cost compared to the systems currently on the market.

Considering the above description, the skilled person may conceive further changes and variants, in order to meet contingent and specific needs.

The embodiments herein described are thus to be intended as non-limiting examples of the invention.

The invention claimed is:

1. A monitoring system of wind-induced motion or vibration in at least one overhead cable, said monitoring system comprising:
at least three sensor nodes adapted to be installed in positions different from each other on a first overhead cable and configured for detecting said motion or vibration through a synchronous signal acquisition;
each of said at least three sensor nodes comprising:
a respective triaxial accelerometer sensor configured for acquiring a first node signal;
a first processor configured for identifying, in said first node signal, a maximum node amplitude and an associated node frequency through a spectral analysis of said first node signal;
said monitoring system further comprising a processing unit (105) operatively associable with said at least three sensor nodes and comprising:
a second processor configured for comparing to each other at least three maximum node amplitudes of said at least three sensor nodes, respectively, for identifying a selected maximum amplitude and an associated selected frequency, said selected maximum amplitude being the maximum of said at least three maximum node amplitudes;
wherein said respective triaxial accelerometer sensor in each of said at least three sensor nodes is further configured for acquiring a second node signal;
wherein said first processor is further configured for identifying in said second node signal, a node selected amplitude and an associated node selected phase through a spectral analysis of said second node signal, said node selected amplitude and said node selected phase being associated with said selected frequency; and
wherein said second processor is further configured for calculating a numerical model based on at least three node selected amplitudes and associated at least three node selected phases, for all of said at least three sensor nodes, for reconstructing said motion or vibration in any point of said at least one overhead cable according to said selected frequency.

2. The monitoring system according to claim 1, wherein said second processor is further configured for calculating a calculated maximum amplitude (YMAX) through said numerical model, at an antinode of a dynamic deformation of said at least one overhead cable, and wherein said processing unit is further configured for transmitting to at least one remote server, at least one piece of information depending on said calculated maximum amplitude (YMAX).

3. The monitoring system according to claim 2, further comprising said remote server, wherein said remote server comprises at least one third processor configured for reconstructing a damage parameter for fatigue of said at least one overhead cable based on said at least one piece of information depending on said calculated maximum amplitude (YMAX), and wherein said remote server further comprises a memory configured for storing a time history of said damage parameter, for a useful life forecast of said at least one overhead cable.

4. The monitoring system according to claim 1, further comprising at least one fourth sensor node adapted to be installed on at least one second overhead cable in a location aligned with one of said at least three sensor nodes, said at least one fourth sensor node being configured for detecting said motion or vibration through a synchronous signal acquisition.

5. The monitoring system according to claim 1, further comprising:
an anemometer device operatively associable with said processing unit and installable in proximity of said at least one overhead cable, said anemometer device being adapted to measure at least one wind direction and speed;
wherein said second processor is further configured for identifying a processing mode based on said wind direction and speed.

6. The monitoring system according to claim 5, wherein said first processor is further configured for identifying in said first node signal, a node maximum phase; wherein said second processor is further configured, for wind speeds exceeding a first threshold, for further receiving said node maximum phase associated with said maximum node amplitude and with said associated node frequency for at least one of said at least three sensor nodes, and wherein said second processor is further configured for calculating a second numerical model based on information on said motion or vibration on directions orthogonal with respect to an axis of said at least one overhead cable.

7. The monitoring system according to claim 1, wherein each of said at least three sensor nodes further comprises a first transceiver unit, configured for transmitting a first piece of information representing said maximum node amplitude and of said associated node frequency;
and wherein said processing unit further comprises a second transceiver unit, configured for receiving said first piece of information from each of said at least three sensor nodes;
wherein said second transceiver unit is further configured for transmitting a second piece of information representing said selected frequency;
wherein said first transceiver unit of each of said at least three sensor nodes is further configured for receiving said second piece of information;
wherein said first transceiver unit is further configured for transmitting a third piece of information representing said node selected amplitude and of said node selected phase;

wherein said second transceiver unit is further configured for receiving said third piece of information from each of said at least three sensor nodes.

8. A monitoring method of wind-induced motion or vibration in at least one overhead cable, said monitoring method comprising:
  installing at least three sensor nodes in positions different from each other on a first overhead cable and detecting said motion or vibration through a synchronous signal acquisition;
  in each of said at least three sensor nodes, acquiring a first node signal through a respective triaxial accelerometer sensor;
  in each of said at least three sensor nodes, identifying, in said first node signal, a maximum node amplitude and an associated node frequency through a spectral analysis of said first node signal;
  operatively associating a processing unit with said at least three sensor nodes;
  in said processing unit, comparing to each other at least three maximum node amplitudes respectively of said at least three sensor nodes, for identifying a selected maximum amplitude and an associated selected frequency, said selected maximum amplitude being the maximum of said at least three maximum node amplitudes;
  in each of said at least three sensor nodes, acquiring a second node signal through said respective triaxial accelerometer sensor;
  in each of said at least three sensor nodes, identifying, in said second node signal, a node selected amplitude and an associated node selected phase through a spectral analysis of said second node signal, said node selected amplitude and said node selected phase being associated with said selected frequency;
  in said processing unit, calculating a numerical model based on at least three node selected amplitudes and associated at least three node selected phases, for all of said at least three sensor nodes, for reconstructing said motion or vibration in any point of said at least one overhead cable according to said selected frequency.

9. The monitoring method according to claim 8, further comprising:
  calculating, through said numerical model, a calculated maximum amplitude (YMAX), at an antinode of a dynamic deformation of said at least one overhead cable, and
  transmitting to at least one remote server at least one piece of information depending on said calculated maximum amplitude (YMAX).

10. The monitoring method according to claim 9, further comprising, in said remote server:
  reconstructing a damage parameter for fatigue of said at least one overhead cable based on said at least one piece of information depending on said calculated maximum amplitude (YMAX),
  storing a time history of said damage parameter, for a useful life forecast of said at least one overhead cable.

11. The monitoring method according to claim 8, further comprising installing at least one fourth sensor node on at least one second overhead cable in a location aligned with one of said at least three sensor nodes and detecting through said at least one fourth sensor node said motion or vibration through a synchronous signal acquisition.

12. The monitoring method according to claim 8, further comprising:
  installing an anemometer device in proximity of said at least one overhead cable,
  associating said anemometer device with said processing unit,
  measuring at least one wind direction and speed through said anemometer device,
  in said processing unit, identifying a processing mode based on said wind direction and speed.

13. The monitoring method according to claim 12, further comprising, for wind speeds exceeding a first threshold, corresponding to sub-span or galloping conditions:
  in at least one of said at least three sensor nodes, identifying, in said first node signal, a node maximum phase;
  in said processing unit, further receiving said node maximum phase associated with said maximum node amplitude and said associated node frequency, and calculating a second numerical model based on information on said motion or vibration on directions orthogonal with respect to an axis of said at least one overhead cable.

14. The monitoring method according to claim 8, comprising:
  in each of said at least three sensor nodes, transmitting a first piece of information representing said maximum node amplitude and said associated node frequency;
  in said processing unit, receiving said first piece of information from each of said at least three sensor nodes and transmitting a second piece of information representing said selected frequency;
  in each of said at least three sensor nodes, receiving said second piece of information and transmitting a third piece of information representing said node selected amplitude and said node selected phase;
  in said processing unit, receiving said third piece of information from each of said at least three sensor nodes.

* * * * *